(12) United States Patent
Weirauch

(10) Patent No.: US 7,746,746 B2
(45) Date of Patent: *Jun. 29, 2010

(54) OPTICAL MEDIA WITH CONTROL DATA IN WOBBLE

(75) Inventor: Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1549 days.

This patent is subject to a terminal disclaimer.

(21) Appl. No.: 10/991,040

(22) Filed: Nov. 16, 2004

(65) Prior Publication Data

US 2006/0104192 A1     May 18, 2006

(51) Int. Cl.
*G11B 7/00* (2006.01)

(52) U.S. Cl. ............... 369/53.2; 369/47.21; 369/47.12; 369/84

(58) Field of Classification Search ... 369/275.1–275.5, 369/44.13, 59.25, 53.2, 94, 47.21, 47.5, 84, 369/85, 47.12; 705/54, 57, 51; 380/44, 45; 713/193

See application file for complete search history.

(56) References Cited

U.S. PATENT DOCUMENTS 5,699,342 A * 12/1997 Yagi et al. ............ 369/47.5

| 5,923,754 | A | 7/1999 | Angelo et al. |
| 6,973,015 | B1 * | 12/2005 | Murakami et al. ....... 369/47.21 |
| 2001/0049662 | A1 | 12/2001 | Linnartz et al. |
| 2004/0168074 | A1 * | 8/2004 | Suh et al. ................ 713/193 |
| 2005/0185548 | A1 * | 8/2005 | Weirauch et al. ........ 369/53.2 |

FOREIGN PATENT DOCUMENTS

| EP | 0930614 | 7/1999 |
| EP | 0997899 | 5/2000 |
| EP | 1505593 | 2/2005 |
| WO | 02054401 | 7/2002 |
| WO | 2004066298 | 8/2004 |
| WO | WO 2004/075187 | 9/2004 |
| WO | 20040985439 | 11/2004 |

* cited by examiner

*Primary Examiner*—Ali Neyzari

(57) ABSTRACT

An optical medium has auxiliary information and control data encoded in wobble. The control data specifies action that a drive is permitted or required to take with the auxiliary information. For example, the control data may be used to specify whether a drive reading the medium is permitted to output a region of the auxiliary information. Alternatively, the control data may be used to specify whether a writing drive is permitted to copy a portion of the auxiliary information to a writeable area on the medium.

5 Claims, 5 Drawing Sheets

OPTICAL MEDIA WITH CONTROL DATA IN WOBBLE

BACKGROUND

Technical Field

The invention relates generally to optical media used for information storage, and drives for reading optical media used for information storage.

Digital optical media are used for a variety of purposes and a variety of information, for example, entertainment data, such as audio and video, and computer data, such as text files and numerical data files. In general, a drive or a host system may request specific data from the physical medium, and there is a need for control of access to some specific data, and a need to control the actions of the drive. For entertainment data in particular, there is a general need for copy protection, copy control, security of decryption keys, and restriction of access to data that is not encrypted. For example, in an integrated entertainment system, a drive reading encrypted data may decrypt the data internally and send the resulting data to an integrated display. If the drive is peripheral to a display, the drive may be required to send encrypted data to the display, where the data is then decrypted inside the display. As an additional example, some video disks are intended for use only in specific geographic regions, and only trusted drives should be permitted to read the restricted video data. There is an ongoing need for control of access to information stored on optical media.

DESCRIPTION

For some digital optical media for information storage, for example some Compact Disks (CD's) and Digital Versatile Disks (DVD's), each data surface has a land and groove structure, with the lands and/or grooves having a sinusoidal radial displacement (called wobble). User information (for example, audio data, video data, or computer data) may be recorded in the grooves, on the lands, or both. Additional system information (for example format information, control information, and auxiliary information) may be encoded in the wobble. For example, in CD's, groove wobble is frequency modulated to encode time information. In more recent DVD's, wobble may be frequency or phase modulated to encode address information and additional auxiliary information, for example, decryption keys.

In example embodiments of the invention, control data encoded in wobble on an optical medium specifies drive action. Depending on the control data, a drive is prohibited from taking, or permitted to take, or required to take, or requested to take specified action with auxiliary information encoded in wobble. In a first example, control data, encoded in wobble, specifies whether a drive is permitted to send auxiliary data, also encoded in wobble, outside the drive. In a second example, control data, encoded in wobble, specifies whether a drive is permitted (or required) to copy auxiliary data (or a transform of the auxiliary data), encoded in wobble, to a writeable area on the medium. In a third example embodiment, control data, encoded in wobble, specifies whether a drive is requested to compare auxiliary data, encoded in wobble, to data written in a writeable area of the medium.

Figure 1A:
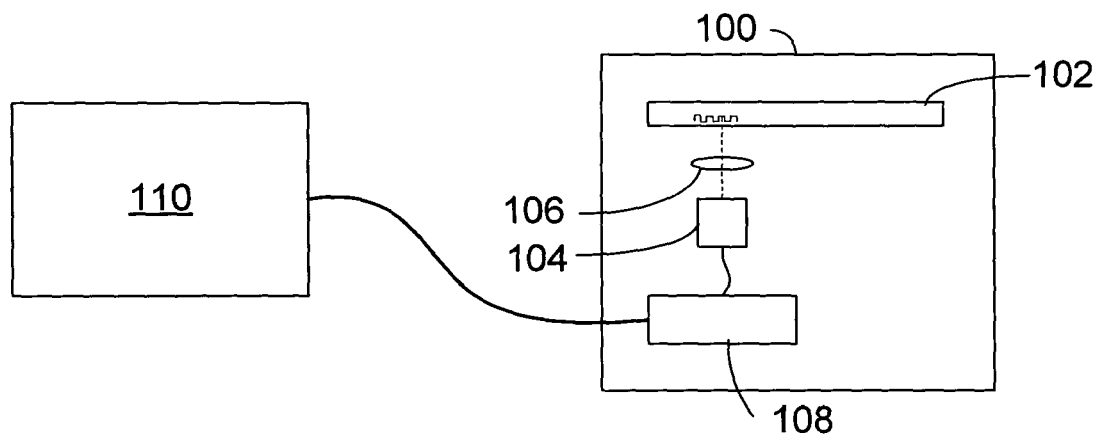
FIG. 1A illustrates an example system in which the invention may be implemented.

FIG. 1A illustrates an example embodiment of a drive 100 including an optical disk 102. An optical head 104 views a land and groove structure on the disk 102 through a lens system 106. A controller 108 transforms signals from the optical head 104 into digital information. The digital information includes user data and information encoded in wobble. The controller 108 is in communication with a host device 110. The drive 100 may be part of the host 110, or optionally the drive may be a peripheral device connected to the host by a cable as illustrated, or optionally the drive may be a peripheral device and communicate with the host wirelessly.

Figure 1B:
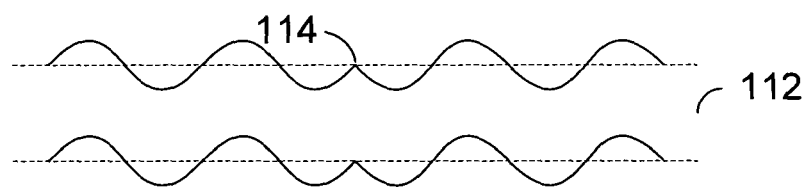
FIG. 1B illustrates an example of information encoded in wobble on a disk in the system of FIG. 1A.

FIG. 1B illustrates a data track 112 on the disk 102 with radial wobble (exaggerated for illustration). In the example of FIG. 1B, the phase of the wobble is inverted at location 114. Patterns of phase inversions define binary ones and zeros, and information is encoded in the patterns of phase inversions of wobble. Alternatively, wobble may be frequency modulated to encode information. There are other ways in which information can be encoded into wobble or other physical structures on the disk used for addressing, physical tracking, or formatting purposes, and for purposes of the present invention, the particular encoding method is not important. In FIG. 1B, user data, and/or the writeable area on the disk, is located on the data track 112 between the areas of wobble. Note that wobble in FIG. 1B is illustrated as being symmetrical on each side of the data track 112. Symmetrical wobble is most common, but in general, wobble may be asymmetrical, or on only one side of the data track.

Figure 1C:
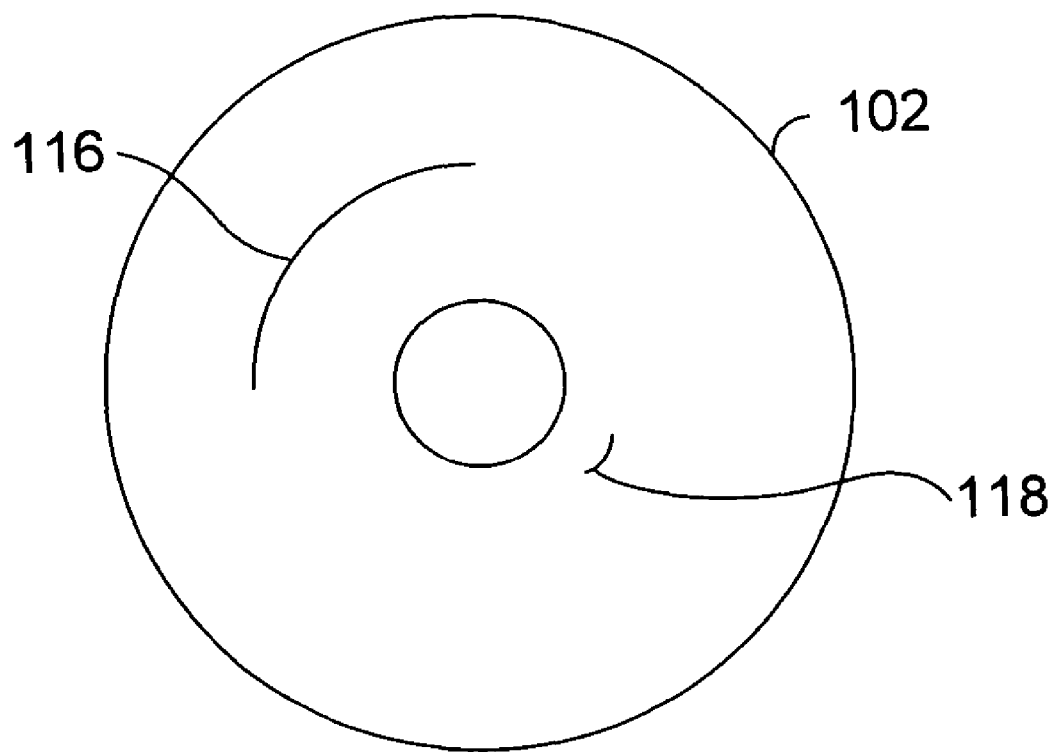
FIG. 1C is a plan view of an optical disk illustrated in FIG. 1A, with examples of regions of control information and regions of auxiliary information.

The disk 102 may have, for example, a single spiral track, or may have, for example, multiple concentric tracks. For purposes of the present invention, the number of tracks is not important. FIG. 1C illustrates a region 116 (or portion, or segment, or block) that is part of a track on the optical disk 102. Region 116 contains auxiliary information encoded in wobble. For convenience of illustration, the region 116 in FIG. 1C is illustrated as about one-fourth of a rotation of the disk. However, the word "region" is intended to mean a subset of a track or tracks. That is, the information encoded in wobble in the region 116 is a subset of the total information encoded in wobble for an entire track (if there is a single spiral track) or set of tracks (if there are concentric circular tracks). Also illustrated in FIG. 1C is a second region (or portion, or segment, or block) 118 of a track on the optical disk 102, containing control information embedded in wobble. The control information may be separate from the auxiliary information, as illustrated in FIG. 1C, or the control information may in included in the auxiliary information.

An example of auxiliary information encoded in wobble is decryption information. If decryption information is encoded in wobble, then the medium may need to specify whether a drive is permitted to send that part of the information encoded in wobble external to the drive. For example, in FIGS. 1A and 1C, control information in region 118 may specify whether a drive is permitted to send auxiliary information in region 116 outside the drive.

For a specific example, one proposed format specifies auxiliary information in a data structure called Extended Format Information, encoded in wobble. Part of the Extended Format Information is a region called a Disk Key Block. The Disk Key Block includes decryption information. In accordance with a specific example of the first embodiment of the invention, a single bit in a control byte specifies whether a drive is permitted to send the decryption information in the Disk Key Block outside the drive. In the specific example, the control byte is encoded at a separate location from the Disk Key Block.

Figure 2:
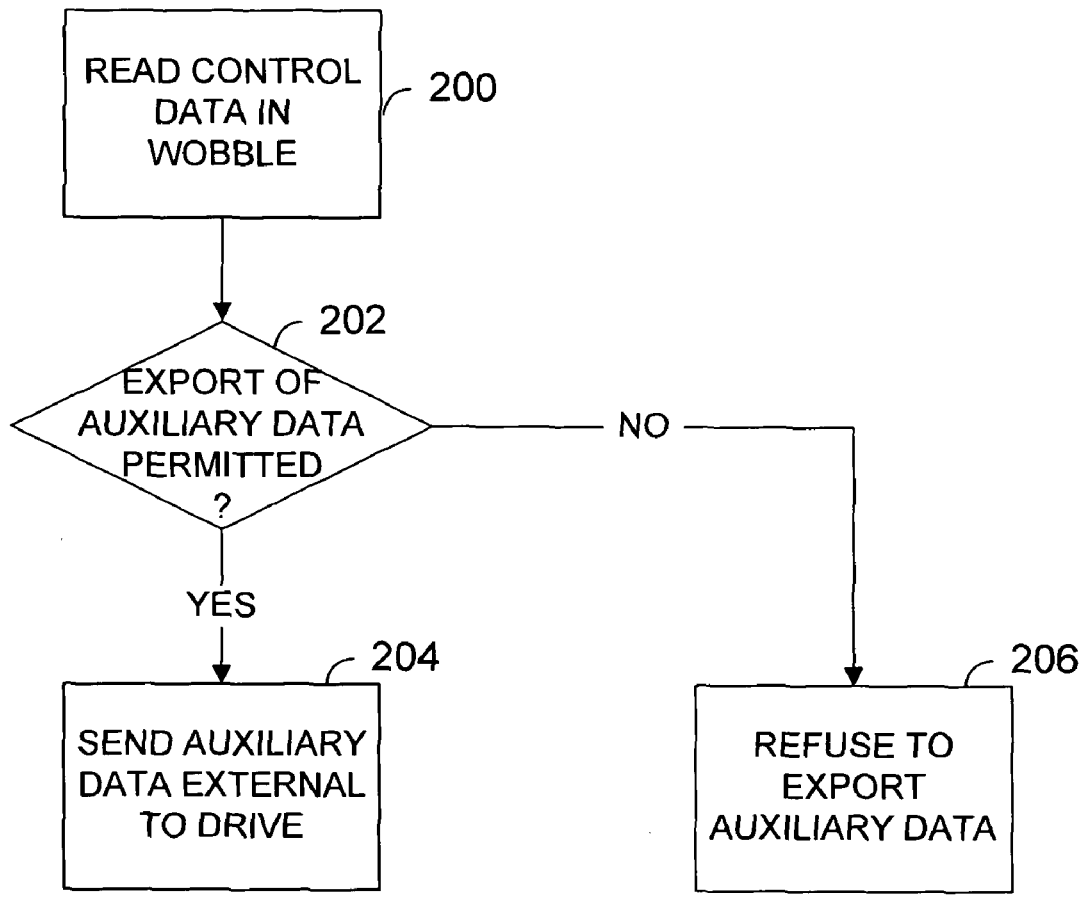
FIG. 2 is a flow chart of an example embodiment of a method for using control data encoded in wobble.

FIG. 2 illustrates an example method. At step 200, a drive reads control data that is encoded in wobble. At step 202, the drive determines whether the value of the control data prohibits sending auxiliary data outside the drive. If export is permitted, then at step 204 the drive sends the auxiliary data outside the drive. At step 206, if export is not permitted, then the drive refuses to export the auxiliary data.

Some drives may not be able to read information encoded in wobble. If there is information in wobble that needs to be accessible by a large population of drives, it may sometimes be desirable for a writing drive to copy part of the information encoded in wobble to a writeable area of the medium. Alternatively, it may be desirable for a writing drive to copy a transform of information encoded in wobble to a writable area of the medium. As one example of transformed information, the data encoded in wobble may be encrypted when written to the writeable area, or the data in wobble may be an encrypted form of the data in the writeable area. As another example, the data encoded in wobble may be encoded in a different format when written. However, it may be desirable to prevent some information, for example decryption keys encoded in wobble, from being copied to a writeable area of the medium. For example, in FIG. 1C, a first value of control information in region 118 may specify that a writing drive is permitted to copy the auxiliary information in region 116 to the part of the disk used for user data, and a second value of the control information in region 118 may specify that the drive must not copy the auxiliary information in region 116 to the user data area on the disk. Alternatively or additionally, the control data may specify that a writing drive must copy the auxiliary data, or a transform of the auxiliary data, to the user data area, or may specify that copying the auxiliary data, or a transform of the auxiliary data, to the user area is optional.

Figure 3:
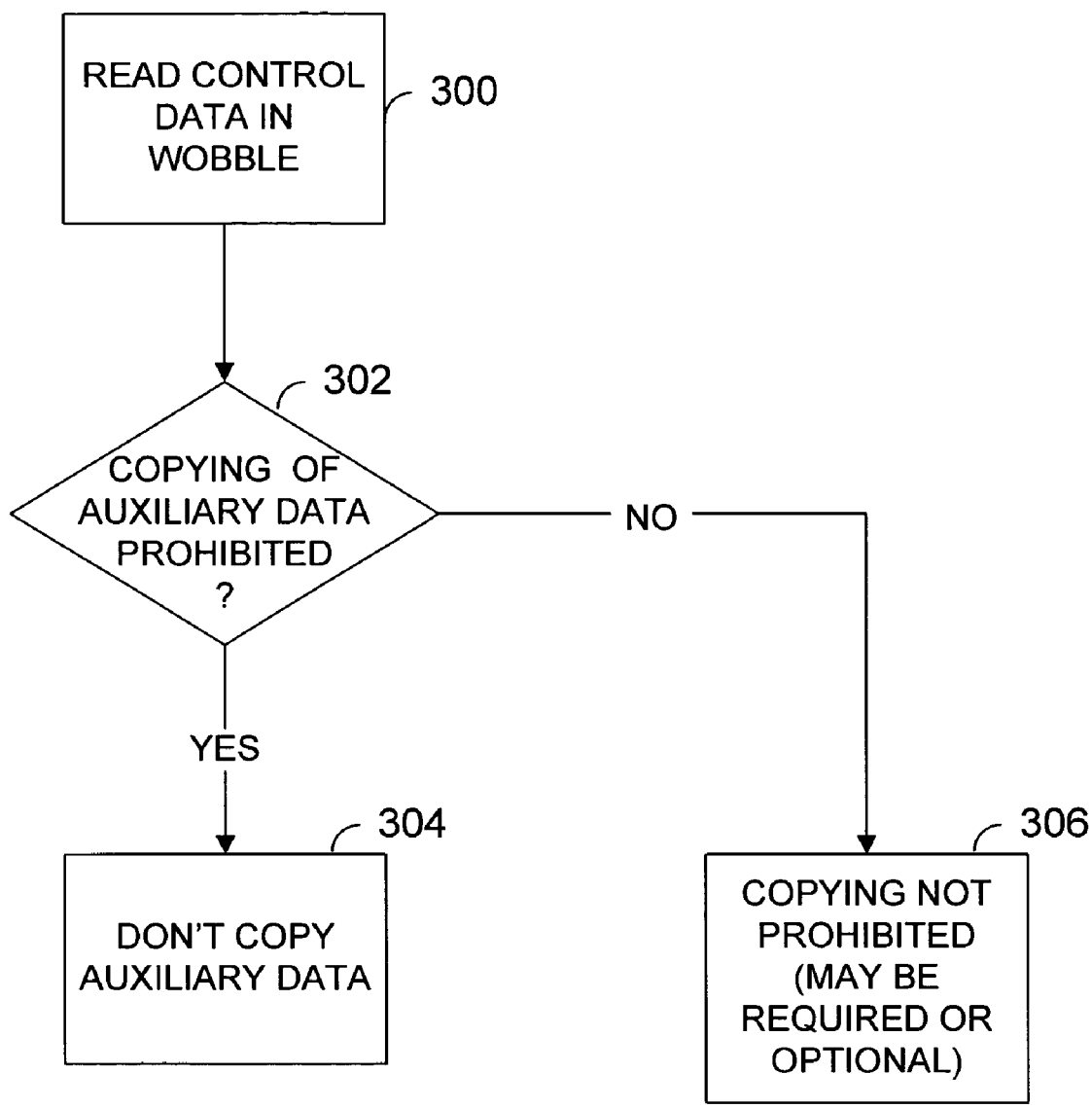
FIG. 3 is a flow chart of a second example embodiment of a method for using control data encoded in wobble.

FIG. 3 illustrates an example method. At step 300, a drive reads control data that is encoded in wobble. At step 302, the drive determines whether the value of the control data prohibits copying of auxiliary data. If copying is prohibited, then at step 304 the drive does not copy the auxiliary data. If copying is not prohibited, then at step 306 the drive may copy the auxiliary data (or a transform of the auxiliary data) to a writeable area of the disk (the value of the control data may specify that copying is required, or may specify that copying is optional).

If auxiliary data is copied to a writeable area of the disk, it is possible for the data to later become defective, overwritten, or modified. For example, the data could be overwritten or modified inadvertently by a non-compliant system, or maliciously in an attempt to subvert a control process, for example to undermine a copy protection system. Another useful control parameter in wobble is control data that specifies that a drive capable of reading the auxiliary data in wobble must verify that the copy of the auxiliary data in a writeable area of the medium is intact. For example, in FIG. 1C, a first value of control data in region 118 may specify that a reading drive must read auxiliary information in region 116 and compare the auxiliary data in region 16 to data in a predetermined region of the writeable area of the disk. Note that it is not necessary for the data in the writeable area of the disk to be identical to the auxiliary information, because the data in the writeable area may be a transform of the auxiliary data. A second value of the control information in region 118 may specify what the drive must do if the data in the writeable area is corrupted. Optionally, if the verifying drive is a writable drive, the parameter may specify that the verifying drive must re-copy the auxiliary data, or a transform of the auxiliary data, to the writeable area of the disk if the data in the writeable area is corrupted. Alternatively, for example, if the data in the writeable area is corrupted, the drive may be required to take some other action, such as refusing to read part of the disk.

Figure 4:
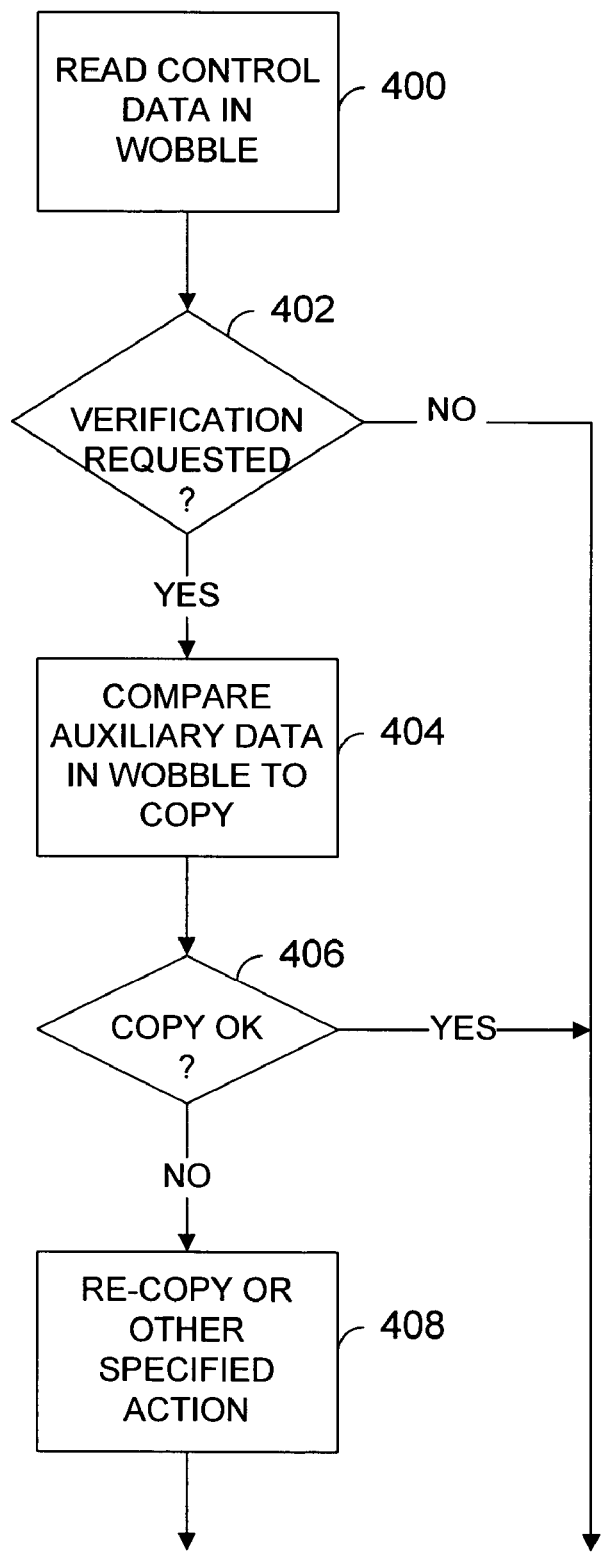
FIG. 4 is a flow chart of a third example embodiment of a method for using control data encoded in wobble.

FIG. 4 illustrates an example method. At step 400, a drive reads control data in wobble. If verification is requested (step 402), then at step 404 a region of the auxiliary data in wobble (or a transform of the data) is compared to a region of data in the writeable area that is supposed to contain a copy of the auxiliary date. If the version in the written area is corrupted (step 406), then at step 408 the drive controller takes appropriate action. Step 402 is described as "requesting" because not all drives can read information encoded in wobble. The action specified by the control data may require verification if the drive can read information encoded in wobble.

What is claimed is:

1. A drive for optical media, comprising:
   means for detecting control data encoded into wobble, the control data specifying whether information encoded in a region of wobble is permitted to be transferred externally to the drive;
   means for refusing to transfer information from the region of wobble, externally to the drive, when transfer is not permitted by the control data.

2. A drive for optical media, comprising:
   means for detecting control data encoded in wobble, the control data specifying whether information encoded in a region of wobble is permitted to be copied to a user data area of the media; and
   means for refusing to copy information from the region of wobble when the control data specifies that copying is not permitted.

3. A drive for optical media, comprising:
   means for detecting control data encoded in wobble, the control data specifying whether information encoded in a region of wobble is permitted to be transformed and written to a user data area of the media; and
   means for refusing to transform and write the information from the region of wobble when the control data specifies that transforming and writing are not permitted.

4. A method, comprising:
   reading, by a drive, control data encoded in wobble on an optical medium;
   refusing, by the drive, to write a transform of data from a region of auxiliary information encoded in wobble to a writeable area of the optical medium, when the control data has a value that specifies that the transform of data from the region of auxiliary information must not be written.

5. A method, comprising:
   reading, by a drive, control data encoded in wobble on an optical medium;
   verifying, by the drive, that information in a writeable area of the optical medium and information encoded in wobble on the optical medium are consistent, when comparison is specified by the control data; and
   copying, by the drive, the information encoded in wobble on the optical medium to the writable area of the optical medium, when the information in the writeable area of the optical medium is not consistent with the information encoded in wobble on the optical medium.

* * * * *